United States Patent [19]
Axelrod

[11] Patent Number: 5,263,436
[45] Date of Patent: Nov. 23, 1993

[54] BONE-SHAPED THERAPEUTIC DEVICE FOR DOGS

[76] Inventor: Herbert R. Axelrod, 6 Marine Pl., Deal, N.J. 07753

[21] Appl. No.: 951,097

[22] Filed: Sep. 25, 1992

[51] Int. Cl.⁵ .............................................. A01K 29/00
[52] U.S. Cl. .................................. 119/710; D30/160; 433/1
[58] Field of Search .............. 119/29, 29.5; 128/62 A; 424/401; D30/160

[56] References Cited

U.S. PATENT DOCUMENTS

| | | | |
|---|---|---|---|
| D. 177,345 | 4/1956 | Nayer | D34/15 |
| D. 207,167 | 3/1967 | Fisher | D12/2 |
| D. 312,515 | 11/1990 | Hall | D30/160 |
| D. 328,122 | 5/1990 | Markham et al. | D30/260 |
| D. 321,434 | 11/1991 | Strickler | D4/136 |
| D. 326,362 | 5/1992 | Bertwell | D4/136 |
| D. 327,962 | 7/1992 | O'Rourke | D30/160 |
| D. 328,805 | 8/1992 | O'Rourke | D30/160 |
| 2,003,958 | 6/1935 | Salisbury | 46/37 |
| 2,103,083 | 12/1937 | Lynch | 128/62 A X |
| 2,134,934 | 11/1938 | Wilhoit | 128/62 A X |
| 3,043,295 | 7/1962 | Ward | 128/62 |
| 3,198,173 | 8/1965 | Fisher | 119/29 |
| 3,231,925 | 2/1966 | Conder | 128/62 A X |
| 4,059,101 | 11/1977 | Richmond | 128/62 |
| 4,513,014 | 4/1985 | Edwards | 426/132 |
| 4,674,444 | 6/1987 | Axelrod | 119/29.5 |
| 4,802,444 | 2/1989 | Markham et al. | 119/29 |
| 4,924,811 | 5/1990 | Axelrod | 119/29 |
| 5,027,796 | 7/1991 | Linzey | 128/62 A |
| 5,033,410 | 7/1991 | Sigurdsson | 119/29.5 |

*Primary Examiner*—Robert P. Swiatek
*Attorney, Agent, or Firm*—Fulwider, Patton, Lee & Utecht

[57] ABSTRACT

A bone-shaped therapeutic chew toy device for a dog consisting of a hard and tough material molded in a form having sharp conically shaped spikes distributed over its surface. As the dog chews on the device, the spikes contact the various surfaces of the dog's teeth and gums and are of sufficient hardness to scrape off accumulated tartar and plaque.

5 Claims, 1 Drawing Sheet

BONE-SHAPED THERAPEUTIC DEVICE FOR DOGS

BACKGROUND OF THE INVENTION

1. Field of the Invention

The present invention relates to chew toys for dogs and more particularly pertains to chew toys that have a beneficial effect on a dog's teeth.

2. Description of Related Art

Several devices have been developed that attempt to remove the plaque and tartar that tends to accumulate on a dog's teeth. Such devices include various brush configurations that require a dog owner to brush a dog's teeth, preferably after every meal. While such cleaning may be effective, it does become rather tedious, a dog may not always be cooperative, and consequently such a regimen is typically not adhered to for any length of time. Similar problems are associated with the various scraping and massaging devices found in the prior art.

An alternative approach has been to provide the dog with an edible chew that is formed of sufficiently hard and abrasive components such that the tooth surfaces are scraped clean as the chew material is broken up during the mastication process. Difficulties arise in selecting a material that is edible yet sufficiently hard and abrasive. Such chews must be able to withstand considerable manipulations and forces prior to breaking up such that a substantial portion of the dog's tooth surfaces are contacted before the material is swallowed.

Another approach heretofore devised in an effort to keep a dogs' teeth clean is the non-edible chew toy. Such devices are typically intended to withstand extended and repeated chewing without deterioration while the surfaces of the chew toy serves to scrap or rub off the accumulated tartar and plaque. By playing with the toy, the dog automatically cleans its own teeth. Disadvantages of these prior art devices are inherent in their limited efficacy. Their particular shapes and configurations often prevent proper contact with the tooth surfaces and/or often have only a limited ability to remove the undesirable deposits when contact is made.

A typical example of the prior art's shortcomings is apparent in devices having shapes that can only be extracted from molds when the chew toy is formed of relatively soft and flexible material. While such devices may thereby have shapes that cause the device to come in contact with most of a dog's teeth surfaces as it is being chewed, its necessarily relatively soft and flexible composition prevents the contacting chew's surface from having the intended effect upon contact with the tooth's surface.

A chew toy is therefore required that effectively removes built-up plaque and tartar from a dog's teeth as the dog chews thereon. This requires the chew toy to be properly shaped in order that the various tooth surfaces are contacted and further requires that the accumulations are removed upon contact.

SUMMARY

The present invention overcomes the disadvantages and shortcomings of the prior art by providing a chew toy that is particularly effective at removing plaque and tartar from the surfaces of a dog's teeth. This is achieved by positioning a plurality of sharp spikes over the entire surface of a molding of a hard and tough elastomeric material. The device preferably is generally bone-shaped having an elongated body member and bulbous shapes or knobs at its ends which similarly have sharp spikes extending therefrom. The device is sized to fit particular dog sizes, i.e., the device should be of sufficient size to preclude a dog from swallowing it. By incorporating a leachable ham scent in the elastomer, dogs will tend to be more attracted thereto and chew on it for extended periods of time.

The spacing and distribution of the individual spikes all over the chew toy, including its bulbous ends, allows most of the surfaces of the dog's teeth and gums to be contacted. The configuration of the individual spikes, i.e., their sharpness, in combination with the substantial hardness of the material used in the device's construction enable the spikes to effectively scrape any accumulated tartar or plaque off the teeth as the dog's jaws apply pressure. Any prolonged chewing and gnawing on the device as dogs are prone to do, will serve to remove most of the accumulated buildup.

While a particular form of the invention has been illustrated and described, it will also be apparent to those skilled in the art that various modifications can be made without departing from the spirit and scope of the invention. Accordingly, it is not intended that the invention be limited except by the appended claims.

DETAILED DESCRIPTION OF THE PREFERRED EMBODIMENT

Figure 1:
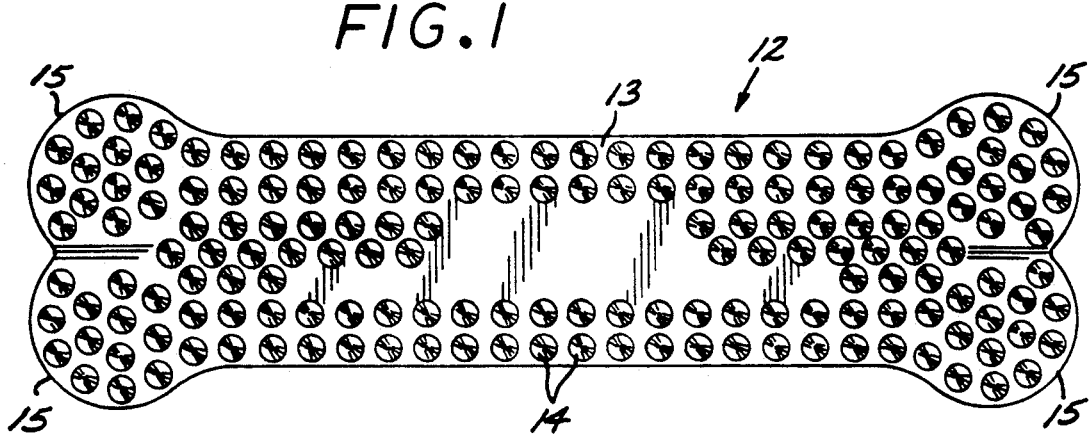
FIG. 1 is a top view of the therapeutic chew toy device of the present invention.
Figure 2:
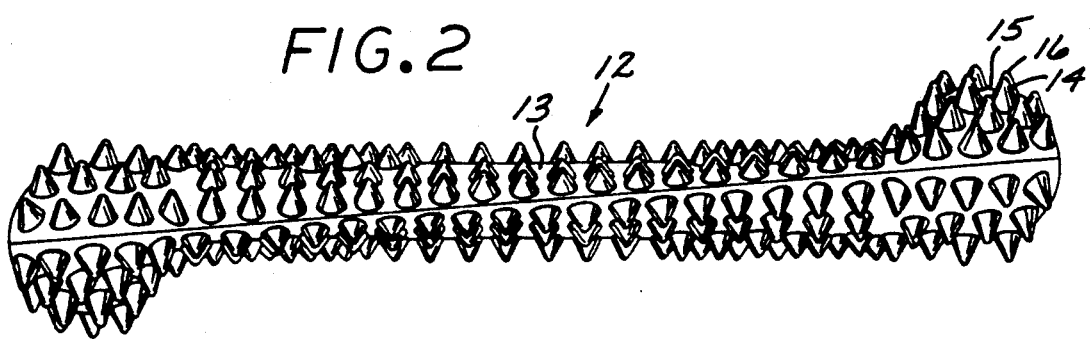
FIG. 2 is a side view of the device shown in FIG. 1.
Figure 3:
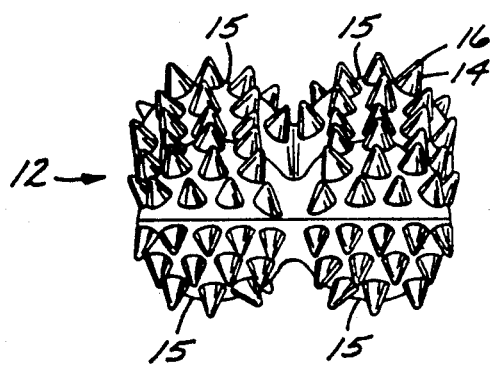
FIG. 3 is an end view of the device shown in FIGS. 1 and 2.

The drawings show the bone-shaped therapeutic chew toy device of the present invention. By chewing and gnawing on the device, accumulated plaque and tartar is removed from a dog's teeth and gums. The removal of such buildup, together with the disturbance of developing colonies of tooth destroying bacteria helps prevent tooth decay.

The illustrated embodiment of the present invention includes a molding 12 shaped in the form of a bone having an elongated body 13 and ends comprising enlarged bulbous shapes or knobs 15. The surface of the molding includes a large number of sharp spikes 14 extending outwardly. Each spike 14 is conical in shape, terminating in a sharp tip 16. The spikes are distributed all over the molding 12, including its body 13 and bulbous ends 15.

The device is molded of a rigid material, such as polyurethane, either a polyethylene or a polyester or a polyamide such as nylon having a durometer hardness of 50-90. The device is preferably injection molded whereby the material is melted prior to injection and subsequently allowed to cool and harden prior to removal from the mold. A leachable appeal-enhancing agent, such as a ham bone scent and/or flavor may be added to the elastomer composition by a method such as that disclosed in my U.S. Pat. No. 4,674,444 issued Jun. 23, 1987.

In use, the device is given to the dog to chew on. Either due to the natural playfulness of a particular dog, or due to the device's ham bone scent, or due to the dog's frustration with his inability to break up the device, dogs tend to spend considerable time and effort chewing and gnawing on the device. The bone-shaped configuration of the device is believed to contribute to its attraction to a dog. As the device is moved around in the dog's mouth and chewed upon, the device is contacted from many different angles and in many different orientations. This causes the many hard and sharp points to contact most if not all of the dog's tooth and gum surfaces. The likelihood of such contact is enhanced by the fact that the knobs 15 extend in opposite vertical directions relative to the body 13. The spikes extending from the bulbous knobs on the ends of the device are able to make contact with the inner surfaces of the dog's teeth near the gum line. The sharpness of each spike and the inherent hardness of the material causes accumulated plaque and tartar to be scraped off the teeth as the dog's jaws bear down on the device. The dog thereby, in effect, cleans his own teeth to prevent tooth decay, while enjoying playing with his toy.

These and other features and advantages of the present invention will become apparent from the following detailed description of a preferred embodiment which, taken in conjunction with the accompanying drawings, illustrates by way of example the principles of the invention.

What is claimed is:

1. A therapeutic chew toy device for a dog, said chew comprising:
    an elongated body formed of a hard and tough material of sufficient size to preclude said dog from swallowing said device;
    a bulbous knob integral with each end of said body, said body and knobs defining a bone-shape;
    a plurality of elongated spikes, each having a sharp tip, integrally extending from the surfaces of said body and knobs, said spikes being so spaced and distributed whereby when the device is moved around in a dog's mouth by the dog, said spike tips come in contact with substantially all of the surfaces of the dog's tooth and gum surfaces and serve to automatically remove plaque and tartar accumulation from said tooth and gum surfaces.

2. The device of claim 1, wherein the knobs extend in opposite vertical directions relative to said main body.

3. The device of claim 1, wherein said material has a durometer hardness of between 50-90.

4. The device of claim 3, wherein said material comprises a polyurethane.

5. The device of claim 1, wherein an appeal-enhancing agent is added to the material from which the device is formed.

* * * * *